Patented July 28, 1942

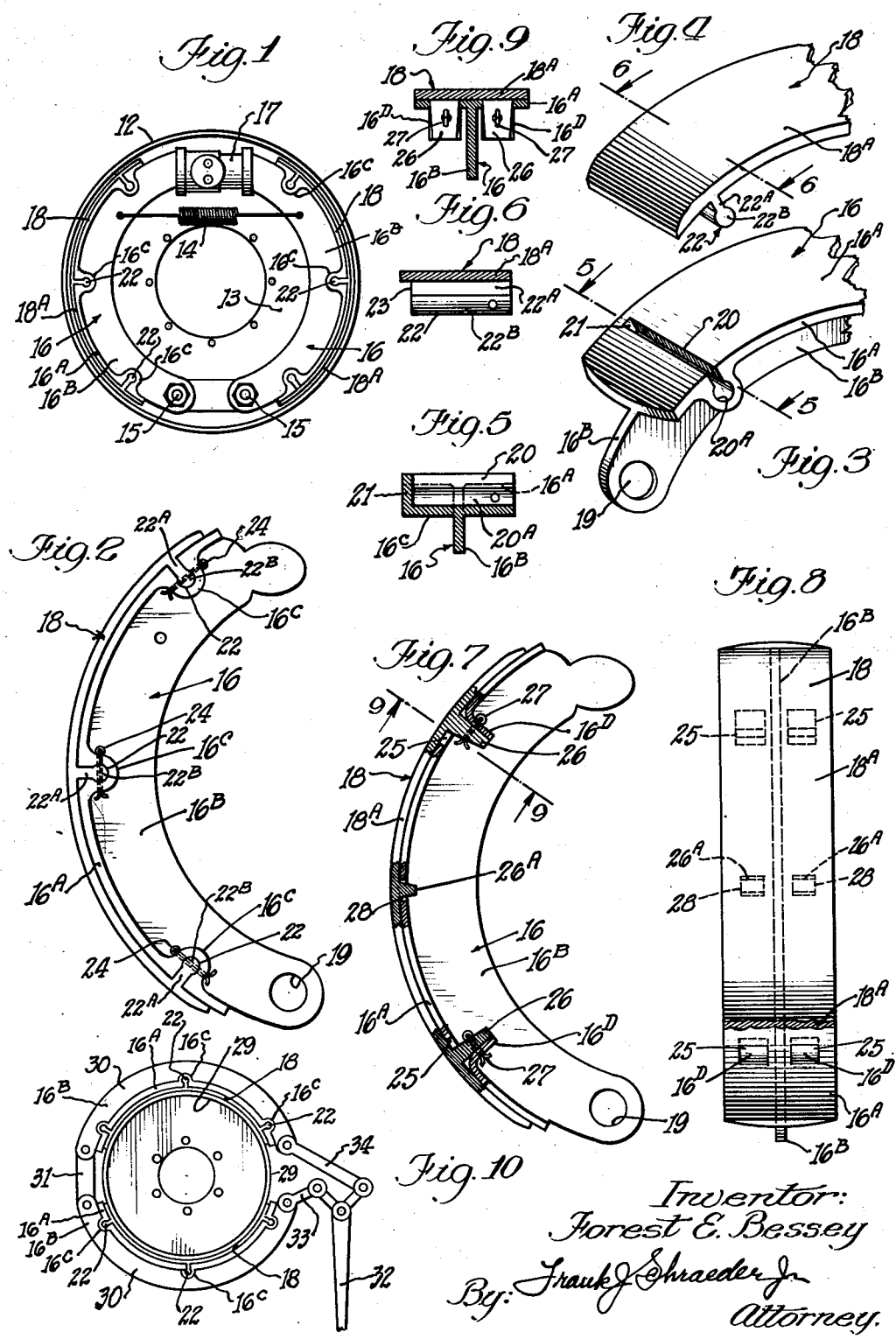

2,291,525

UNITED STATES PATENT OFFICE 2,291,525

BRAKE SHOE ASSEMBLY

Forest E. Bessey, Chicago, Ill.

Application November 4, 1940, Serial No. 364,165

8 Claims. (Cl. 188—242)

This invention relates generally to new and useful improvements in brake shoe assemblies adapted for use in connection with vehicle wheel brake mechanisms on automobiles, buses, trucks, aircraft, and various agricultural machinery, such as tractors, or on various brakes for industrial machines.

The invention is particularly directed to novel improvements in the brake shoes and the brake linings therefor which are especially adaptable for use on brake mechanisms of the internal expanding type, or on the external type.

One of the objects of my invention is to provide a novel brake shoe assembly of simple and novel construction wherein the friction drum-braking portion shall be free from rivets or other metallic connecting or securing means to obviate the scoring of vehicle wheel brake drums by such metallic securing means, and to afford the installation or removal of the brake shoe lining without the use of special tools in a comparatively short time.

At present, brake linings are commonly secured to their supporting shoes by metal rivets which distort or interrupt the true arcuate braking face of the brake lining by providing undesirable surface depressions wherein dirt may accumulate to thus decrease the effective area of the available braking surface. Having no metal rivets or other metal connectors, my improved brake lining may be used until it is practically completely worn through to the brake shoe.

Another object of my invention is found in the novel construction of the interlocking means for securely retaining the brake lining on the brake shoe, such means including grooved brake shoe portions adapted to receive inwardly or outwardly disposed anchorage portions of the brake lining for preventing accidental displacement thereof either transversely or parallelly to the axis of the wheel.

I am aware of certain attempts made heretofore to provide rivetless molded brake linings with wedge-shaped anchors for arcuate brake shoes such as were attempted to be used on internal expanding brake mechanisms in automobile wheels, but these attempts have not succeeded in providing the desired practical, inexpensive and efficient brake assemblies. The objectional disadvantages which resulted in such attempted molded brake linings having wedge-shaped anchorage portions consisted in the necessarily heavy flanges of the usual, or preferable, T-shaped brake shoes. These flanges had to be substantially increased in thickness with the result that such brake shoes were not only more expensive but too heavy and sluggish in action.

It is therefore an object of my invention to provide a novel rivetless molded or cast brake lining having integral interlocking or anchoring means for securely mounting and retaining such brake linings on brake shoes of T-shaped cross-section and wherein the lining-receiving face of the brake shoe is free from any outwardly projecting portions which might be apt to score the brake drum in the event the lining became excessively worn.

With the above and other objects in view, my invention consists in the novel combination, construction and arrangement of the parts and members shown in preferred embodiments in the attached drawing, described in the following specification, and particularly pointed out in the appended claims.

In the drawing, wherein like reference numerals indicate like or corresponding parts or members:

Fig. 1 is an inside view of a vehicle wheel brake drum showing a brake shoe assembly embodying novel features of my invention;

Fig. 2 is an enlarged side elevation of one of the brake shoes and brake lining therefor shown in Fig. 1;

Fig. 3 is a further enlarged perspective view of one end portion of the brake shoe;

Fig. 4 is perspective view of an end portion of the brake lining;

Fig. 5 is a cross-section taken on line 5—5 of Fig. 3;

Fig. 6 is a cross-section taken on line 6—6 of Fig. 4;

Fig. 7 is a side elevation of a brake shoe and lining therefor showing a modified form of my invention;

Fig. 8 is a plan view of the brake shoe assembly shown in Fig. 7 having a portion of the lining broken away to show the brake shoe;

Fig. 9 is a cross-section taken on line 9—9 of Fig. 7; and

Fig. 10 illustrates the application of my invention to an external brake.

Referring to Fig. 1, showing one of the many types of present automobile wheel brake assemblies, 12 indicates the wheel brake drum, 13 the brake drum outside wall, 14 indicates a spring which acts to hold the brake shoes 16 normally in brake-released position, 15 indicates the anchor pins for the pivoted ends of the brake shoes, 17 indicates a hydraulic piston for operating the brake mechanism into braking position, and 18 indicates the improved brake lining.

Referring now to Figs. 2 to 6 inclusive, the cast brake shoe 16 consists of an arcuate segmental flange 16A having an inner integral stiffening rib or stem 16B provided with an opening 19, at one end, for the anchor pin 15. The opposite end of the shoe is adapted for operative engagement with the fluid operated piston 17.

The brake shoe flange 16A is provided with a plurality of spaced transversely disposed grooves 20 which extend radially inwardly of the brake shoe within the inwardly disposed transverse flange portions 16C of increased cross-section.

The grooves 20 are preferably increased in cross-sectional area at the inner portions, as at 20A, and these grooves are preferably closed at one end by the wall 21. See Figs. 2, 3, 4 and 5.

The brake shoe lining 18 may be molded of a suitable brake lining material or composition, such as a molded asbestos composition. The lining 18 consists of an arcuate brake-drum engaging portion 18A of substantially uniform width and uniform thickness with beveled or slightly curved end face portions.

Disposed radially inwardly, and formed integrally with a portion 18A, are a plurality of transverse spaced anchorage portions 22, each of which consist of a stem portion 22A of uniform cross-section formed with an enlarged interlocking inner head portion 22B preferably of almost circular cross-section.

The lining 18 and its spaced anchors 22 are so formed that the lining may be slidably mounted on the shoe, that is, the anchors 22 may be slidably inserted into the grooves 20 of the brake shoe 16.

When the grooves 20 are closed at one end by the walls 21, the anchors 22 terminate, at the inner end 23, a spaced distance from the adjacent side of the lining so that such ends 23 of the anchors 22 abut with the inner face of the walls 21 whereby transverse displacement of the lining 18 is resisted in one direction by such wall 21 of the brake shoe 16.

When the brake lining 18 is slidably mounted on the brake shoe 16, the enlarged head portions 22B will snugly fit within the enlarged groove portions 20A and will interlock the lining 18 with the brake shoe 16. The cotter pins 24 will prevent displacement of the lining 18 transversely of the shoe 16, and one or more of such cotter pins 24 may be used, preferably two.

The construction of the lining anchorage portion to abut with the wall 21 of the shoe also facilitates proper mounting of the lining to present the cotter pin opening in the anchorage portions in alignment with the pair of cotter pin openings in each of the enlarged flange portions 16C.

Obviously, the interlocking head portions 22B of the anchors 22, might readily be made of any other suitable enlarged cross-section to fit the grooves 20 which would be formed of corresponding cross-section.

In the modified form of my invention illustrated in Figs. 7, 8 and 9, the flange 16A of the shoe 16 is provided with preferably two spaced sets of openings 25, each set consisting of two rectangular openings 25, spaced one on each side of the web 16B.

The openings 25 are formed by cutting and then bending inwardly rectangular portions of the shoe flange 16A to present short radially disposed spaced walls 16D.

The modified brake shoe lining 18, shown in Figs. 7, 8 and 9, consists of the arcuate portion 18A of uniform width and thickness formed with spaced pairs of inwardly radially disposed anchorage lugs 26 formed integrally with the portion 18A.

The anchorage lugs 26 extend through the openings 25 and may be made of any suitable cross-section. I have preferred to show same as of rectangular cross-section. I have also preferred to show such lugs of generally inwardly tapered form each having one face in abutment with one of the brake shoe inwardly bent walls 16D whereby the lining 18 is retained against circumferential displacement relatively to the supporting flange 16A of the brake shoe 16.

The lugs 26 obviously retain the lining 18 against displacement transversely to the longitudinal axis of the arcuate flange 16A of the brake shoe 16.

One or more cotter pins 27 extending through the lugs 26 and walls 16D retain the lining 18 against radial displacement from the brake shoe 16.

In this modified brake shoe assembly, the brake shoe 16 consists of a light-weight standard rolled T section of comparatively thin cross-section.

Both of the disclosed forms or types of linings disclosed herein are pre-cast or pre-formed and quickly adapted to replace the worn lining by simply extracting the retaining cotter pins as the linings are not riveted to the brake shoes.

The modified lining may also be provided with one or more comparatively short lugs 26A which extend through the openings 28 in the shoe flange 16A and insure against any slight displacement of the central portion of the lining.

Fig. 10 shows the application of my invention in an external brake for the brake drum 29.

The brake shoes 30 are connected together at one end by a link 31 and at their opposite ends are connected to the brake-operating forked lever 32 through the pivoted links 33 and 34.

The brake shoe and brake lining parts shown in Fig. 10 which are similar to those shown in Figs. 1 to 6 inclusive are indicated by like reference numerals.

Obviously, the shoe and lining shown in Figs. 7, 8 and 9 are also adaptable to an external brake type of assembly such as shown in Fig. 10.

I claim:

1. In an internal brake assembly, a cast segmental brake shoe of T section comprising a flange of comparatively thin cross-section formed with a longitudinal integral rib of comparatively thin cross-section, said shoe flange having a plurality of spaced transverse slots and spaced integral wall portions disposed below the inside face of said shoe flange, said slots extending below the inside face of said shoe flange into said wall portions, a pre-formed unitary segmental lining of uniform cross-section removably mounted on the outside face of said shoe flange and having a plurality of spaced integral transverse anchorage portions adapted to be slidably interposed into said brake shoe slots, and means comprising an elongated member disposed parallel to said flange rib and extending through each of the flange wall portions and through each of the anchorage portions for retaining said lining against accidental displacement transversely of the brake shoe.

2. In an internal brake assembly as embodied in claim 1 and including said brake shoe slots having inner portions of increased cross-section and said anchorage portions having outer portions of increased cross-section provided with a transverse opening and corresponding in section to and interfitting within said increased cross-sectional portions of said slots for receiving said elongated retaining member to thereby prevent transverse displacement of the lining and for interlocking said lining with said brake shoe to thereby prevent radial displacement of the lining.

3. In an internal brake assembly, a cast segmental brake shoe of T section comprising a flange formed with a single longitudinal integral rib on its inside face, said shoe flange having a plurality of spaced portions of increased thickness disposed on the inside face of the shoe flange, formed integrally with said shoe flange and said rib, and extending transversely of said shoe flange from one side thereof to the opposite side thereof, a slot extending transversely of and from one side of said brake shoe into a portion of the brake shoe flange and within each of said flange portions of increased thickness, said flange portions each having a pair of transverse openings therein near the open end of said slot, a pre-formed unitary lining of uniform thickness removably mounted on the outside face of said shoe flange having a plurality of spaced integral anchorage portions disposed within said shoe slots, said anchorage portions having a transverse opening in alignment with said openings in said flange portions, each of said anchorage portions extending transversely of said lining from one side the lining and terminating a spaced distance from the other side of the lining to facilitate the proper insertion and mounting of the lining, and a detachable member extending through said aligned openings in the said flange portions and said anchorage portions for retaining the lining against accidental displacement transversely of the brake shoe.

4. In an internal brake assembly, a segmental brake shoe composed of a rolled steel T section comprising an arcuate flange and an integral rib, said flange having spaced portions thereof cut and bent inwardly to provide spaced openings therein and the bent portions thereof presenting inwardly disposed walls, a segmental lining removably mounted on said brake shoe flange, said lining comprising an arcuate strip of frictional composition having integral spaced lugs adapted for insertion through said shoe flange openings, said lugs being in abutment with said inwardly disposed walls of said shoe flange, and means for removably securing said lugs to said inwardly disposed walls.

5. In an internal brake assembly as embodied in claim 4 and including said openings in said shoe flange arranged in spaced pairs and each of said lugs having a flat face in engagement with one of said inwardly bent walls of the shoe flange.

6. In a brake assembly, a segmental brake shoe of T section comprising a flange with spaced openings therein and an integral longitudinal reenforcing rib, said flange having integral wall portions disposed below the inside face thereof adjacent said openings, a segmental lining of uniform material throughout all portions thereof removably mounted on the operative face of said shoe flange and including anchorage portions formed integrally with and depending from the inner face of said segmental lining and extending into said brake shoe flange openings, and means extending substantially parallel to the longitudinal axis of said shoe and through at least one of said anchorage portions for securing at least one of said anchorage portions to at least one of said brake shoe flange wall portions.

7. In a brake assembly including a cast segmental brake shoe of T section comprising a flange of comparatively thin cross-section formed with a longitudinal integral rib of comparatively thin cross-section and wherein said shoe flange has a plurality of spaced transverse slots and spaced integral wall portions disposed below the inside face of said shoe flange and wherein said slots extend below the inside face of said shoe flange into said wall portions, a pre-formed unitary segmental lining of uniform cross-section removably mounted on the operative face of said shoe flange and having a plurality of spaced integral transverse anchorage portions adapted to be slidably interposed into said brake shoe slots, and cotter pins extending substantially parallel to the longitudinal axis of the shoe and through said anchorage portions for retaining said lining against accidental displacement transversely of the brake shoe.

8. A preformed unitary brake shoe lining adapted for use in a brake assembly which includes a cast segmental brake shoe of T section comprising a flange formed with a single longitudinal integral rib on its inside face and wherein said shoe flange has a plurality of spaced portions of increased thickness disposed on the inside face of the shoe flange, formed integrally with said shoe flange and said rib, and extending transversely of said shoe flange from one side thereof to the opposite side thereof, and a slot extending transversely of and from one side of said brake shoe into a portion of the brake shoe flange and within each of said flange portions of increased thickness, said flange portions each having a pair of transversely aligned openings near the open end of the slot, said pre-formed unitary lining of uniform thickness being removably mounted on the braking face of said shoe flange and having a plurality of spaced integral anchorage portions disposed within said shoe slots and each extending transversely of said lining from one side of the lining and terminating a spaced distance from the other side of the lining to facilitate the proper insertion and mounting, each anchorage portion having an opening therein in register with said pair of openings in each of said flange portions, and a detachable member extending through said openings in said flange portions and said anchorage portions for retaining the lining against accidental displacement from the brake shoe.

FOREST E. BESSEY.